United States Patent
Laney et al.

(10) Patent No.: US 7,132,136 B2
(45) Date of Patent: Nov. 7, 2006

(54) STACKED MICROVOIDED LIGHT DIFFUSER

(75) Inventors: Thomas M. Laney, Spencerport, NY (US); Michael R. Brickey, Rochester, NY (US); Cheryl J. Kaminsky, Rochester, NY (US); Robert P. Bourdelais, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 30 days.

(21) Appl. No.: 10/020,404

(22) Filed: Dec. 14, 2001

(65) Prior Publication Data

US 2003/0118807 A1 Jun. 26, 2003

(51) Int. Cl.
*C09K 19/00* (2006.01)

(52) U.S. Cl. .......................... 428/1.1; 428/1.3; 359/64; 349/112; 362/351

(58) Field of Classification Search ................. 428/1.1, 428/1.3, 34.1, 35.7; 250/515.1; 359/64; 349/112; 362/351
See application file for complete search history.

(56) References Cited

U.S. PATENT DOCUMENTS

| | | | | |
|---|---|---|---|---|
| 2,465,319 A | * | 3/1949 | Dickson et al. | 526/71 |
| 2,901,466 A | * | 8/1959 | Smith et al. | 528/288 |
| 3,615,972 A | * | 10/1971 | Morehouse et al. | 156/79 |
| 3,903,234 A | * | 9/1975 | Ikeda et al. | 264/154 |
| 4,377,616 A | * | 3/1983 | Ashcraft et al. | 428/213 |
| 4,420,607 A | * | 12/1983 | Morris et al. | 528/298 |
| 4,459,402 A | * | 7/1984 | Morris et al. | 528/298 |
| 4,468,510 A | * | 8/1984 | Morris et al. | 528/298 |
| 4,632,869 A | * | 12/1986 | Park et al. | 428/315.5 |
| 4,758,462 A | * | 7/1988 | Park et al. | 428/213 |
| 4,912,333 A | | 3/1990 | Roberts et al. | 250/487.1 |
| 5,223,383 A | | 6/1993 | Maier et al. | 450/533 |
| 6,030,756 A | | 2/2000 | Bourdelais et al. | 430/363 |
| 6,057,961 A | * | 5/2000 | Allen et al. | 359/494 |
| 6,074,788 A | | 6/2000 | Bourdelais et al. | 430/18 |
| 6,093,521 A | | 7/2000 | Laney et al. | 430/363 |
| 6,177,153 B1 | | 1/2001 | Uchiyama et al. | 428/14 |
| 6,217,184 B1 | | 4/2001 | Koike et al. | 362/37 |

FOREIGN PATENT DOCUMENTS

EP  0182632 A2 * 5/1986

OTHER PUBLICATIONS

Co-pending, commonly assigned, concurrently filed, U.S. Patent Application titled "Microvoided Light Diffuser", of Michael R. Brickey.
Co-pending, commonly assigned, concurrently filed, U.S. Patent Application titled "Microvoided Light Diffuser Containing Optical Contact Layer", of Robert P. Bourdelais.
Co-pending, commonly assigned, concurrently filed, U.S. Patent Application titled "Light Diffusion Material With Color Temperature Correction", of Cheryl J. Kaminsky.

* cited by examiner

*Primary Examiner*—Marc A. Patterson
(74) *Attorney, Agent, or Firm*—Arthur E. Kluegel

(57) ABSTRACT

The invention relates to a light diffuser comprising a polymeric film wherein the film comprises a plurality of layers having void geometry in which the x/y/z size or frequency varies by at least 28% between at least two layers.

31 Claims, 1 Drawing Sheet

STACKED MICROVOIDED LIGHT DIFFUSER

CROSS REFERENCE TO RELATED APPLICATIONS

This application is related to three applications co-filed herewith Ser. Nos. 10/017,402, filed Dec. 14, 2001, now pending; 10/017,002, filed Dec. 14, 2001, now abandoned; and 10/020,714, filed Dec. 14, 2001, now abandoned, the contents of which are incorporated herein by reference.

FIELD OF THE INVENTION

The invention relates to a diffuser for specular light. In a preferred form, the invention relates to a back light diffuser for rear projection liquid crystal display devices.

BACKGROUND OF THE INVENTION

Optical structures that scatter or diffuse light generally function in one of two ways: (a) as a surface diffuser utilizing surface roughness to refract or scatter light in a number of directions; or (b) as a bulk diffuser having flat surfaces and embedded light-scattering elements.

A diffuser of the former kind is normally utilized with its rough surface exposed to air, affording the largest possible difference in index of refraction between the material of the diffuser and the surrounding medium and, consequently, the largest angular spread for incident light. However, some prior art light diffusers of this type suffer from two major drawbacks: a high degree of backscattering and the need for air contact. Backscattering causes reflection of a significant portion of the light back to the originating source when it should properly pass through the diffuser, lowering the efficiency of the optical system. The second drawback, the requirement that the rough surface must be in contact with air to operate properly, may also result in lower efficiency. If the input and output surfaces of the diffuser are both embedded inside another material, such as an adhesive for example, the light-dispersing ability of the diffuser may be reduced to an undesirable level.

In one version of the second type of diffuser, the bulk diffuser, small particles or spheres of a second refractive index are embedded within the primary material of the diffuser. In another version of the bulk diffuser, the refractive index of the material of the diffuser varies across the diffuser body, thus causing light passing through the material to be refracted or scattered at different points. Bulk diffusers also present some practical problems. If a high angular output distribution is sought, the diffuser will be generally thicker than a surface diffuser having the same optical scattering power. If however the bulk diffuser is made thin, a desirable property for most applications, the scattering ability of the diffuser may be too low.

Despite the foregoing difficulties, there are applications where an embedded diffuser may be desirable, where the first type of diffuser would not be appropriate. For example, a diffuser layer could be embedded between the output polarizer layer and an outer hardcoat layer of a liquid crystal display system to protects the diffuser from damage. Additionally, a diffuser having a thin profile, which will retain wide optical scattering power when embedded in other materials and have low optical backscatter and therefore higher optical efficiencies than conventional diffusers, would be highly desirable.

U.S. Pat. No. 6,093,521 describes a photographic member comprising at least one photosensitive silver halide layer on the top of said member and at least one photosensitive silver halide layer on the bottom of said member, a polymer sheet comprising at least one layer of voided polyester polymer and at least one layer comprising nonvoided polyester polymer, wherein the imaging member has a percent transmission of between 38 and 42%. While the voided layer described in U.S. Pat. No. 6,093,521 does diffuse back illumination utilized in prior art light boxes used to illuminate static images, the percent transmission between 38 and 42% would not allow a enough light to reach an observers eye for a liquid crystal display. Typically, for liquid crystal display devices, back light diffusers must be capable of transmitting at least 65% and preferably at least 80% of the light incident on the diffuser.

In U.S. Pat. No. 6,030,756 (Bourdelais et al), a photographic element comprises a transparent polymer sheet, at least one layer of biaxially oriented polyolefin sheet and at least one image layer, wherein the polymer sheet has a stiffness of between 20 and 100 millinewtons, the biaxially oriented polyolefin sheet has a spectral transmission between 35% and 90%, and the biaxially oriented polyolefin sheet has a reflection density less than 65%. While the photographic element in U.S. Pat. No. 6,030,756 does separate the front silver halide from the back silver halide image, the voided polyolefin layer would diffuse too much light creating a dark liquid crystal display image. Further, the addition of white pigment to the sheet causes unacceptable scattering of the back light. The photographic element contains a layer of voids that are generally the same size. They vary in void volume by 10% or less.

In U.S. Pat. No. 5,223,383 photographic elements containing reflective or diffusely transmissive supports are disclosed. While the materials and methods disclosed in this patent are suitable for reflective photographic products, the % light energy transmission (less than 40%) is not suitable for liquid crystal display as % light transmission less than 40% would unacceptable reduce the brightness of the LC device.

In U.S. Pat. No. 4,912,333, X-ray intensifying screens utilize microvoided polymer layers to create reflective lenslets for improvements in imaging speed and sharpness. While the materials disclosed in U.S. Pat. No. 4,912,333 are transmissive for X-ray energy, the materials have a very low visible light energy transmission which is unacceptable for LC devices.

In U.S. Pat. No. 6,177,153, oriented polymer film containing pores for expanding the viewing angle of light in a liquid crystal device is disclosed. The pores in U.S. Pat. No. 6,177,153 are created by stress fracturing solvent cast polymers during a secondary orientation. The aspect ratio of these materials, while shaping incident light, expanding the viewing angle, do not provide uniform diffusion of light and would cause uneven lighting of a liquid crystal formed image. Further, the disclosed method for creating voids results in void size and void distribution that would not allow for optimization of light diffusion and light transmission. In example 1 of this patent, the reported 90% transmission includes wavelengths between 400 and 1500 nm integrating the visible and invisible wavelengths, but the transmission at 500 nm is less that 30% of the incident light. Such values are unacceptable for any diffusion film useful for image display, such as a liquid crystal display.

PROBLEM TO BE SOLVED BY THE INVENTION

There remains a need for an improved light diffusion of image illumination light sources to provide improved light transmission while simultaneously diffusing specular light sources.

SUMMARY OF THE INVENTION

The invention provides a light diffuser comprising a polymeric film wherein the film comprises a plurality of layers having void geometry in which the x/y/z size or frequency varies by at least 28% between at least two layers. The invention also provides a back lighted imaging media, a liquid crystal display component and device.

ADVANTAGEOUS EFFECT OF THE INVENTION

The invention provides improved light transmission while simultaneously diffusing specular light sources.

DETAILED DESCRIPTION OF THE INVENTION

Figure 1:
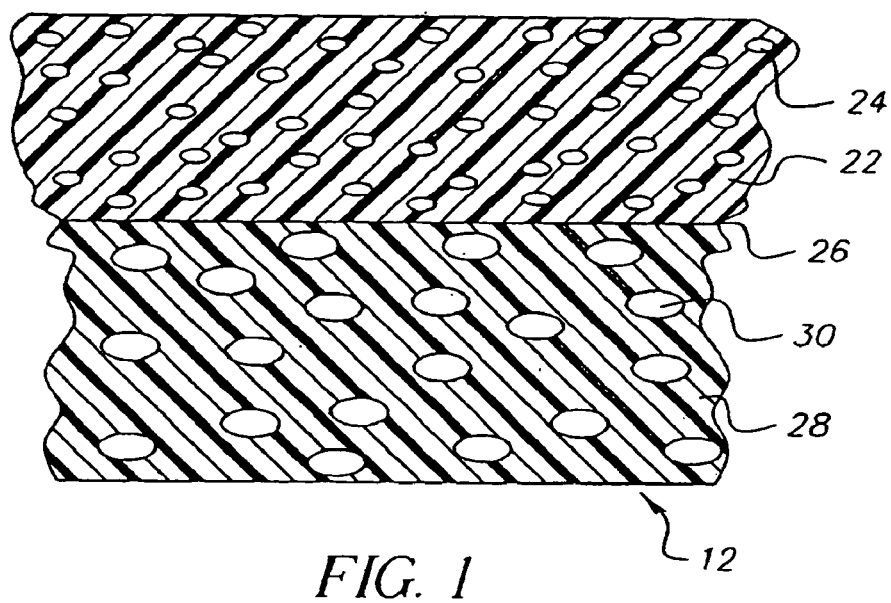
FIG. 1 illustrates a cross section voided polymer diffusion material that contains stacked voids suitable for use in a liquid crystal display device.

The invention has numerous advantages over prior practices in the art. The invention provides diffusion of specular light sources that are commonly used in rear projection display devices such as liquid crystal display devices. Further, the invention, while providing diffusion to the light sources, has a high light transmission rate. A high transmission rate for light diffusers is particularly important for liquid crystal display devices as a high transmission value allows the liquid crystal display to be brighter or holding the level of brightness the same, allows for the power consumption for the back light to be reduces therefore extending the lifetime of battery powered liquid crystal devices that are common for note book computers. The voided polymer layers of the invention can be easily changed to achieve the desired diffusion and light transmission requirements for many liquid crystal devices thus allowing the invention materials to be responsive to the rapidly changing product requirements in the liquid crystal display market.

Multiple layers of varying void size and frequency is advantaged to a layer a comparable thickness containing one size and frequency of void because the multiple layer film becomes diffuses more efficiently. In a polymeric film comprising layers of voids of decreasing size or frequency in relation to the light passing through the film, the voided layers with large void size or frequency diffuses the light coarsely. As the light passes through other layers with smaller voids or lower frequency of voids, the light is more finely diffused. This increases the diffuse light transmission efficiency as compared to a single film of comparable thickness with only one size or frequency void. Stacking the layers in order of increasing or decreasing frequency or size has the same effect of providing stepwise diffusion and thus is more efficient than an a single layer of equal void size or frequency.

The invention eliminates the need for an air gap between prior art light diffusers that contain a rough surface and the brightness enhancement films used in liquid crystal display devices. The elimination of the air gap allows for the diffuser materials to be adhesively adhered to other film components in the liquid crystal display making the unit lighter in weight and lower in cost.

The invention materials do not contain inorganic particles typical for prior art voided polymer films that cause unwanted scattering of the back light source and reduce the transmission efficiency of the liquid crystal display device. Further, the elastic modulus and scratch resistance of the diffuser is improved over prior art cast coated polymer diffusers rendering a more robust diffuser during the assembly operation of the liquid crystal device. These and other advantages will be apparent from the detailed description below.

The term "LCD" mean any rear projection display device that utilizes liquid crystals to form the image. The term "diffuser" means any material that is able to diffuse specular light (light with a primary direction) to a diffuse light (light with random light direction). The term "light" means visible light. The term "diffuse light transmission efficiency" means the ratio of % diffuse transmitted light at 500 nm to % total transmitted light at 500 nm multiplied by a factor of 100. The term "polymeric film" means a film comprising polymers. The term "polymer" means homo- and co-polymers. The term microbead means polymeric spheres typically synthesized using the limited coalescence process. These microbead spheres can range in size from 0.2 to 30 micrometers. They are preferably in the range of 0.5 to 5.0 micrometers. The term microvoids means pores formed in an oriented polymeric film during stretching. These pores are initiated by either inorganic particles, organic particles, or microbeads. The size of these voids is determined by the size of the particle or microbeads used to initiate the void and by the stretch ratio used to stretch the oriented polymeric film. The pores can range from 0.6 to 150 um's in machine and cross machine directions of the film. They can range from 0.2 to 30 micrometers in height. Preferably the machine and cross machine direction pore size is in the range of 1.5 to 25 micrometers. Preferably the height of the pores is in the range of 0.5 to 5.0 micrometers. The term substantially circular means indicates a geometrical shape where the major axis is no more than two times the minor axis.

The term "x/y/z size" means the length of the void in the x, y, or z direction. The x/y/z size of the polymer void describes the void geometry. The z direction is the direction parallel to the light path. The x and y directions lie in the plane perpendicular to the light path. The term "frequency" means the number voids per unit volume. For example, a diffuser sheet has a frequency of $7/cm^3$.

The preferred diffuser material of the invention comprises two voided layers because it is easily manufacturable and provides the advantages seen in multiple layer film structures.

Preferably, the polymeric film comprises at least two voided layers and at least one non-voided layer, more preferred is the polymeric material containing at least two voided layers separated by a non-voided layer. This non-voided layer is preferred because it is the more efficient place for addenda such as a polymer processing aid. Its preferred place of the non-voided layer between the layers of voided films is because it is advantaged to have diffusion before and after the layer containing addenda.

The polymeric film comprises a plurality of layers that are integral. "Integral" means that the layers were formed together at the time of manufacture and not assembled from a combination of films. A plurality of layers that are integral is preferred because it reduces the number of processing steps and creates film interfaces in optical contact. Further, an integral layer provides excellent inter-layer adhesion.

Preferably, the polymeric film comprises addenda that are added to a layer in the diffuser film to aid in film processing, or to change color of the film.

Preferably, the light diffuser with a plurality of voided layers varying in geometry or frequency improve the diffuse light transmission efficiency compared to a single voided layer of the same thickness and either void geometry or frequency by at least 10% at 500 nm. 10% increase in the diffuse light transmission efficiency represents a significant advantage in the use of the 'stacked' microvoided diffusion film over a monolayer film in an LCD.

Substantially circular voids, or voids whose major axis to minor axis is between 2.0 and 0.5 are preferred as substantially circular voids have been shown to provide efficient diffusion of light energy and reduce uneven diffusion of light energy. A major axis diameter to minor axis diameter ratio of less than 2.0 is preferred. A ratio less than 2.0 has been shown to provide excellent diffusion of LC light sources. Further, a ratio greater than 3.0 yields voids that are spherical and spherical voids have been shown to provide uneven dispersion of light. A ratio between 1.0 and 1.6 is most preferred as light diffusion and light transmission is optimized.

Preferably, two voided layers in the polymeric film differ in frequency or at least one of the dimensions of the void in the x, y, or z, direction by more than 28%. Two layers in the polymeric film that differ in the dimensions in the x, y, z or in frequency by less than 28% could be accounted for by the natural distribution of bead and void size. Deviations in the size of the void initiating beads cause differences in void frequency and dimension up to 25%.

It is preferred that two voided layers in the polymeric film differ in frequency or at least one of the dimensions of the void in the x, y, or z, direction by more than 28%, but less than 300%. When the frequency or one of the dimensions of the voids change more than 300% between layers, scattering efficiency is diminished.

In another embodiment of the invention, two voided layers in the polymeric film differ in frequency or at least one of the dimensions of the void in the x, y, or z, direction by more than 60%. Deviations in the size of the void initiating beads may cause differences in void frequency and dimension up to 60%.

Layers in "order of increasing size" means that the light passes though the voided layer which has the smallest sized voids then though the next layer with larger size voids and through layers with increasing size voids. Layers in "order of decreasing size" means that the light passes though the voided layer which has the largest sized voids then though the next layer with smaller size voids and through layers with decreasing size voids. Layers in "order of increasing frequency" means that the light passes though the voided layer that has the lowest frequency voids then though the next layer with higher frequency voids and through layers with increasing frequency voids. Layers in "order of decreasing frequency" means that the light passes though the voided layer that has the highest frequency voids then though the next layer with lower frequency voids and through layers with decreasing frequency voids. By passing through these voided layer orientations, the light is gradually diffuse increasing the diffuse light transmission efficiency.

FIG. 1 is a cross section of the light diffuser 12 of the invention containing two voided layers. Light diffuser 12 contains polymer matrix layer 22 which comprises small voids 24. Large air voids 30 are dispersed in polymer matrix layer 28. The two voided layers contain interface 26.

Figure 2:
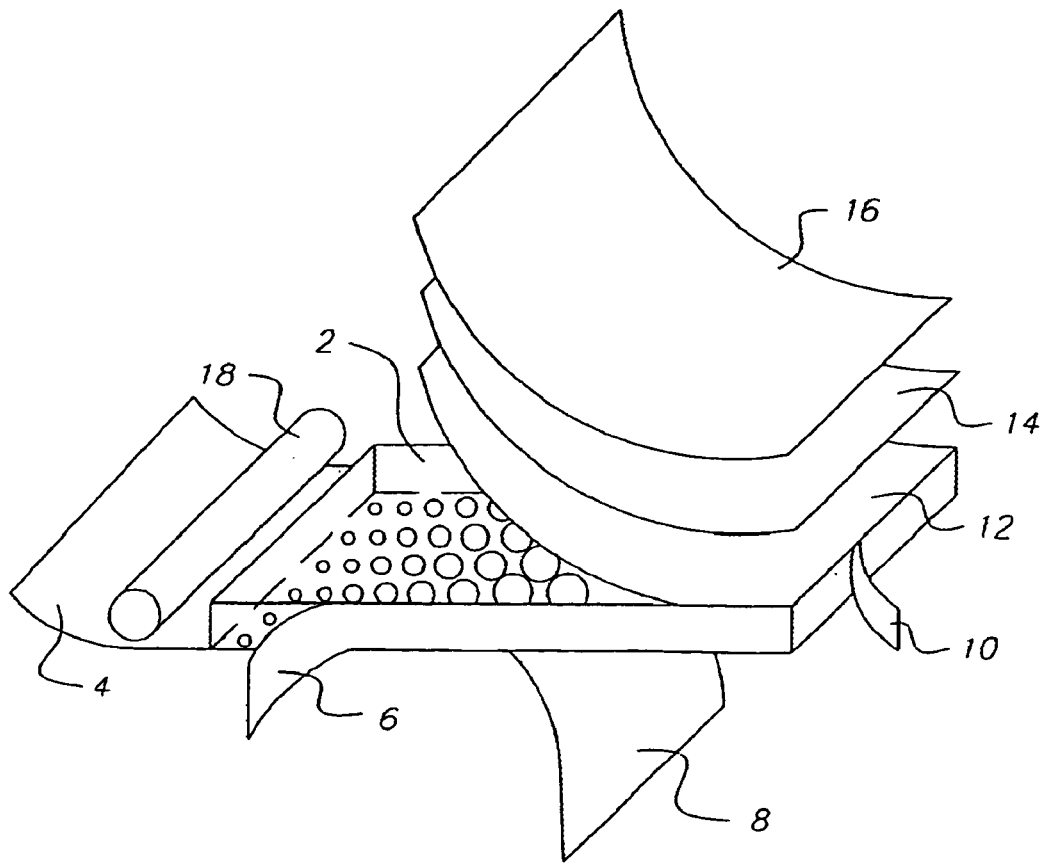
FIG. 2 illustrates a liquid crystal display device with a light diffuser that contains stacked voids.

FIG. 2 illustrates a liquid crystal display device with a light diffuser 12 with multiple polymer voided layers. Visible light source 18 is illuminated and light is guided into acrylic board 2. Reflector tape 4 is used to focus light energy into the acrylic board 2. Reflection tape 6, reflection tape 10 and reflection film 8 are utilized to keep light energy from exiting the acrylic board in an unwanted direction. Diffusion film 12 containing multiple polymer voided layers is utilized to diffuse light energy exiting the acrylic board in the direction perpendicular to the diffusion film. Brightness enhancement film 14 is utilized to focus the light energy into polarization 16. The diffusion film 12 containing multiple polymer voided layers is in optical contact with brightness enhancement film 14.

Better control and management of the back light are driving technological advances for liquid crystal displays (LCD). LCD screens and other electronic soft display media are back lit primarily with specular (highly directional) fluorescent tubes. Diffusion films are used to distribute the light evenly across the entire display area and change the light from specular to diffuse. Light exiting the liquid crystal section of the display stack leaves as a narrow column and must be redispersed. Diffusers are used in this section of the display to selectively spread the light out horizontally for an enhanced viewing angle.

Diffusion is achieved by light scattering as it passes though materials with varying indexes of refraction. This scattering produces a diffusing medium for light energy. There is an inverse relationship between transmittance of light and diffusion and the optimum combination of these two parameters must be found for each application.

The back diffuser is placed directly in front of the light source and is used to even out the light throughout the display by changing specular light into diffuse light. The diffusion film is made up of simple optical structures to broaden the light. Prior art methods for diffusing LCD back light include layering polymer films with different indexes of refraction, embossing a pattern onto the film, or coating the film with matte resins or beads.

The role of the front diffuser is to broaden the light coming out of the liquid crystal (LC) with directional selectivity. The light is compressed into a tight beam to enter the LC for highest efficient and when it exits it comes out as a narrow column of light. The diffuser uses optical structures to spread the light selectively. Most companies form elliptical micro-lens to selectively stretch the light along one axis. Elliptically shaped polymers in a polymer matrix and surface micro-lenses formed by chemical or physical means achieve this directionality.

The invention provides a film that scatters the incident light while providing high light transmission. The oriented film of the present invention can be produced by using a conventional film-manufacturing facility in high productivity. The invention utilizes voided thermal plastic layers containing microvoids. Microvoids of air in a polymer matrix are preferred and have been shown to be a very efficient diffuser of light compared to prior art diffuser materials which rely on surface roughness on a polymer sheet to create light diffusion for LCD devices. The microvoided layers containing air have a large index of refraction difference between the air contained in the voids (n=1) and the polymer matrix (n=1.2 to 1.8). This large index of refraction difference provides excellent diffusion and high light transmission which allows the LCD image to be brighter and/or the power requirements for the light to be reduces thus extending the life of a battery. The preferred diffuse light transmission of the diffuser material of the invention are greater than 65% at 500 nm. Diffuser light transmission less than 60% at 500 nm does not let a sufficient quantity of light pass through the diffuser, thus making the diffuser inefficient. A more preferred diffuse light transmission of the microvoided thermoplastic voided layer is greater than 80% at 500 nm. An 80% at 500 nm diffuse transmission allows the LC device to improve battery life and increase screen brightness. The most preferred diffuse transmission of the voided thermoplastic layer is greater than 87% at 500 nm. A diffuse transmission of 87% at 500 nm allows diffusion of the back light source and maximizes the brightness of the LC device significant improving the image quality of an LC device for outdoor use where the LC screen must compete with natural sunlight.

Since the microvoids of the invention are substantially air, the index of refraction of the air containing voids is 1. An index of refraction difference between the air void and the thermoplastic matrix is preferably greater than 0.2. An index of refraction difference greater than 0.2 has been shown to provide excellent diffusion of LCD back light sources and a index of refraction difference of greater than 0.2 allows for bulk diffusion in a thin film which allows LCD manufacturers to reduce the thickness of the LC screen. The thermoplastic diffusion layer preferably contains at least 4 index of refraction changes greater than 0.2 in the vertical direction. Greater than 4 index of refraction changes have been shown to provide enough diffusion for most LC devices. 30 or more index of refraction differences in the vertical direction, while providing excellent diffusion, significantly reduces the amount of transmitted light, significantly reducing the brightness of the LC device.

Since the thermoplastic light diffuser of the invention typically is used in combination with other optical web materials, a light diffuser with an elastic modulus greater than 500 MPa is preferred. An elastic modulus greater than 500 MPa allows for the light diffuser to be laminated with a pressure sensitive adhesive for combination with other optical webs materials. Further, because the light diffuser is mechanically tough, the light diffuser is better able to withstand the rigors of the assembly process compared to prior art cast diffusion films which are delicate and difficult to assemble. A light diffuser with an impact resistance greater than 0.6 GPa is preferred. An impact resistance greater than 0.6 GPa allows the light diffuser to resist scratching and mechanical deformation that can cause unwanted uneven diffusion of the light causing "hot" spots in an LC device.

The thickness of the light diffuser preferably is less than 250 micrometers. Current design trends for LC devices are toward lighter and thinner devices. By reducing the thickness of the light diffuser to less than 250 micrometers, the LC devices can be made lighter and thinner. Further, by reducing the thickness of the light diffuser, brightness of the LC device can be improved. The more preferred thickness of the light diffuser is between 12.5 and 50 micrometers which further allows the light diffuser to be convienently combined with a other optical materials in an LC device such as brightness enhancement films. Further, by reducing the thickness of the light diffuser, the materials content of the diffuser is reduced.

The thickness uniformity of the light diffuser across the diffuser is preferably less than 0.10 micrometers. Thickness uniformity is defined as the diffuser thickness difference between the maximum diffuser thickness and the minimum diffuser thickness. By orienting the light diffuser of the invention, the thickness uniformity of the diffuser is less than 0.10 micrometers, allowing for a more uniform diffusion of light across the LC device compared to cast coated diffuser. As the LC market moves to larger sizes (40 cm diagonal or greater), the uniformity of the light diffusion becomes an important image quality parameter. By providing a voided light diffuser with thickness uniformity less than 0.10 micrometers across the diffusion web, the quality of image is maintained.

For light diffuser of the invention, micro-voided composite biaxially oriented polyolefin sheets are preferred and are manufactured by coextrusion of the core and surface layer(s), followed by biaxial orientation, whereby voids are formed around void-initiating material contained in the core layers. For the biaxially oriented layer, suitable classes of thermoplastic polymers for the biaxially oriented sheet and the core matrix-polymer of the preferred composite sheet comprise polyolefins. Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. Polyethylene is preferred, as it is low in cost and has desirable strength properties. Such composite sheets are disclosed in, for example, U.S. Pat. Nos. 4,377,616; 4,758,462 and 4,632,869, the disclosure of which is incorporated for reference. The light diffuser film comprises a polymer sheet with at least one voided polymer layer and could contain nonvoided polyester polymer layer(s). It should comprise a void space between about 2 and 60% by volume of said voided layer of said polymer sheet. Such a void concentration is desirable to optimize the transmission and reflective properties while providing adequate diffusing power to hide back lights and filaments. The thickness of the micro void-containing oriented film of the present invention is preferably about 1 micrometer to 400 micrometer, more preferably 5 micrometer to 200 micrometer. A polymer sheet having a percent transmission greater than 65% at 500 nm.

The thermoplastic diffuser of the invention is preferably provided with a one or more nonvoided skin layers adjacent to the microvoided layers. The nonvoided skin layers of the composite sheet can be made of the same polymeric materials as listed above for the core matrixes. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core layers. Any suitable polyester sheet may be utilized for the member provided that it is oriented. The orientation provides added strength to the multi-layer structure that provides enhanced handling properties when displays are assembled. Microvoided oriented sheets are preferred because the voids provide opacity without the use of $TiO_2$. Microvoided layers are conveniently manufactured by coextrusion of the core and thin layers, followed by biaxial orientation, whereby voids are formed around void-initiating material contained in the thin layers.

Polyester microvoided light diffusers are also preferred as oriented polyester has excellent strength, impact resistance and chemical resistance. The polyester utilized in the invention should have a glass transition temperature between about 50.degree. C. and about 150.degree. C., preferably about 60–100.degree. C., should be orientable, and have an intrinsic viscosity of at least 0.50, preferably 0.6 to 0.9. Suitable polyesters include those produced from aromatic, aliphatic, or cyclo-aliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoiso-phthalic, and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well-known techniques, e.g., those described in U.S. Pat. Nos. 2,465,319 and 2,901,466. Preferred continuous matrix polymers are those having repeat units from terephthalic acid or naphthalene dicarboxylic acid and at least one glycol selected from ethylene glycol, 1,4-butanediol, and 1,4-cyclohexanedimethanol. Poly(ethylene terephthalate), which may be modified by small amounts of other monomers, is especially preferred. Polypropylene is also useful. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. Nos. 4,420,607; 4,459,402; and 4,468,510.

The coextrusion, quenching, orienting, and heat setting of polyester diffuser sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

Additional layers preferably are added to the microvoided polyester diffusion sheet which may achieve a different effect. Such layers might contain tints, antistatic materials, or different void-making materials to produce sheets of unique properties. Biaxially oriented sheets could be formed with surface layers that would provide an improved adhesion. The biaxially oriented extrusion could be carried out with as many as 10 layers if desired to achieve some particular desired property.

Addenda are preferably added to a polyester skin layer to change the color of the film. Colored pigments that can resist extrusion temperatures greater than 320. degree. C. are preferred as temperatures greater than 320. degree. C. are necessary for coextrusion of the skin layer.

An addenda of this invention that could be added is an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4-Bis (O-Cyanostyryl) Benzol and 2-Amino-4-Methyl Phenol. An unexpected desirable feature of this efficient use of optical brightener. Because the ultraviolet source for a transmission display material is on the opposite side of the image, the ultraviolet light intensity is not reduced by ultraviolet filters common to imaging layers. The result is less optical brightener is required to achieve the desired background color.

The polyester diffuser sheets may be coated or treated after the coextrusion and orienting process or between casting and full orientation with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion. By having at least one nonvoided skin on the micro-voided core, the tensile strength of the sheet is increased and makes it more manufacturable. It allows the sheets to be made at wider widths and higher draw ratios than when sheets are made with all layers voided. The non-voided layer(s) can be peeled off after manufacture of the film. Coextruding the layers further simplifies the manufacturing process.

The oriented thermoplastic diffuser sheets of the present invention may be used in combination with one or more layers selected from an optical compensation film, a polarizing film and a substrate constitution a liquid crystal layer. The oriented film of the present invention is preferably used by a combination of oriented film/polarizing film/optical compensation film in the order. In the case of using the above films in combination in a liquid crystal display device, the films are preferably bonded with each other e.g. through a tacky adhesive for minimizing the reflection loss, etc. The tacky adhesive is preferably those having a refractive index close to that of the oriented film to suppress the interfacial reflection loss of light.

The oriented thermoplastic diffusion sheet of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyarylate and triacetyl cellulose.

The oriented thermoplastic diffuser sheet of the present invention may be incorporated with e.g. an additive or a lubricant such as silica for improving the drawability and the surface-slipperiness of the film within a range not to deteriorate the optical characteristics to vary the light-scattering property with an incident angle. Examples of such additive are organic solvents such as xylene, alcohols or ketones, fine particles of an acrylic resin, silicone resin or Δ metal oxide or a filler.

The micro void-containing oriented film of the present invention usually has optical anisotropy. A biaxially drawn film of a thermoplastic polymer is generally an optically anisotropic material exhibiting optical anisotropy having an optic axis in the drawing direction. The optical anisotropy is expressed by the product of the film thickness d and the birefringence Δn which is a difference between the refractive index in the slow optic axis direction and the refractive index in the fast optic axis direction in the plane of the film, i.e. Δn.multidot.d (retardation). The orientation direction coincides with the drawing axis in the film of the present invention. The drawing axis is the direction of the slow optic axis in the case of a thermoplastic polymer having a positive intrinsic birefringence and is the direction of the fast optic axis for a thermoplastic polymer having a negative intrinsic birefringence. There is no definite requirement for the necessary level of the value of Δn.multidot.d since the level depends upon the application of the film, however, it is preferably 50 nm or more.

The microvoid-containing oriented film of the present invention has a function to diffuse the light. A periodically varying refractive index distribution formed by these numerous microvoids and micro-lens formed by the microvoided layers forms a structure like a diffraction grating to contribute to the optical property to scatter the light. The voided thermoplastic diffuser sheet provides excellent scattering of light while having a high % light transmission. "Void" is used herein to mean devoid of added solid and liquid matter, although it is likely the "voids" contain gas. The void-initiating particles which remain in the finished diffuser sheet core should be from 0.1 to 10 micrometers in diameter, preferably round in shape, to produce voids of the desired shape and size. Voids resulting from the use of initiating particles of this size are termed "microvoids" herein. The voids exhibit a dimension of 10 micrometeres or less in the unoriented thickness or Z direction of the layer. The size of the void is also dependent on the degree of orientation in the machine and transverse directions. Ideally, the void would assume a shape which is defined by two opposed and edge contacting concave disks. In other words, the voids tend to have a substantially circular cross section in the plane perpendicular to the direction of the light energy (also termed the vertical direction herein). The voids are oriented so that the two major dimensions (major axis and minor axis) are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

Microvoids formed from organic spheres are preferred because they are low in light scattering, have been shown to form substantially circular voids and are easily dispersed in polyester. Further, the size and the shape of the voided diffuser layer can be changed by proper selection of organic sphere size and amount. Microvoids that are substantially free of scattering inorganic particles is also preferred. Prior art voided polymer layers that use inorganic particles such as clay, $TiO_2$, and silica have been shown to unacceptably scatter visible light energy. Scattering light energy from the back light source reduces the efficiency of the display unit by scattering light energy away from the LC and back toward the light source. It has been shown that inorganic microvoiding particles can cause as much as 8% loss in transmitted light energy.

A microvoid is a void in the polymer layer of the diffuser that has a volume less than 100 micrometers. Microvoids larger than 100 micrometers are capable of diffusing visible light, however, because the void size is large, uneven diffusion of the light occurs resulting in uneven lighting of display devices. A thermoplastic microvoid volume between 8 and 42 cubic micrometers is preferred. A microvoided volume less than 6 cubic micrometers is difficult to obtain as the voiding agent required for 6 cubic micrometers is to small to void with typical 3×3 orientation of polyester. A microvoid volume greater than 50 cubic micrometers, while providing diffusion, creates a thick diffusion layer requiring extra material and cost. The most preferred void volume for the thermoplastic diffuser is between 10 and 20 cubic micrometers. Between 10 and 20 cubic micrometers has been shown to provide excellent diffusion and transmission properties.

The organic void-initiating material may be selected from a variety of materials, and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=$CH_2$, wherein Ar represents an aromatic hydrocarbon radical, or an aromatic halohydrocarbon radical of the benzene series and R is hydrogen or the methyl radical; acrylate-type monomers include monomers of the formula $CH_2$=C(R')C(O)(OR) wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula $CH_2$=CH(O)COR, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series HO(CH.sub.2).sub.n OH wherein n is a whole number within the range of 2–10 and having reactive olefinic linkages within the polymer molecule, the above described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof Preferred crosslinked polymer beads have a mean particle size less than 2.0 micrometers, more preferably between 0.3 and 1.7 micrometers. Crosslinked polymer beads smaller than 0.3 micrometers are prohibitivly expensive. Crosslinked polymer beads larger than 1.7 micrometers make voids that large and do not scatter light efficiently.

Suitable cross-linked polymers for the microbeads used in void formation during sheet formation are polymerizable organic materials which are members selected from the group consisting of an alkenyl aromatic compound having the general formula

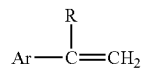

wherein Ar represents an aromatic hydrocarbon radical, or an aromatic halohydrocarbon radical of the benzene series and R is hydrogen or the methyl radical; acrylate-type monomers including monomers of the formula

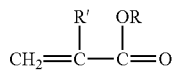

wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having the formula

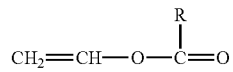

wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series $HO(CH_2)_nOH$, wherein n is a whole number within the range of 2–10 and having reactive olefinic linkages within the polymer molecule, the hereinabove described polyesters which include copolymerized therein up to 20 percent by weight of a second acid or ester thereof having reactive olefinic unsaturation and mixtures thereof, and a cross-linking agent selected from the group consisting of divinyl-benzene, diethylene glycol dimethacrylate, oiallyl fumarate, diallyl phthalate, and mixtures thereof.

Examples of typical monomers for making the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, arrylamidomethyl-propane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield nonuniformly sized particles, characterized by broad particle size distributions. The resulting beads can be classified by screening to produce beads spanning the range of the original distribution of sizes. Other processes such as suspension polymerization and limited coalescence directly yield very uniformly sized particles. U.S. Pat. No. 6,074,788, the disclosure of which is incorporated for reference. It is preferred to use the "limited coalescence" technique for producing the coated, cross-linked polymer microbeads. This process is described in detail in U.S. Pat. No. 3,615,972. Preparation of the coated microbeads for use in the present invention does not utilize a blowing agent as described in this patent, however. Suitable slip agents or lubricants include colloidal silica, colloidal alumina, and metal oxides such as tin oxide and aluminum oxide. The preferred slip agents are colloidal silica and alumina, most preferably, silica. The cross-linked polymer having a coating of slip agent may be prepared by procedures well known in the art. For example, conventional suspension polymerization processes wherein the slip agent is added to the suspension is preferred. As the slip agent, colloidal silica is preferred.

The microbeads of cross-linked polymer range in size from 0.1–50 .mu.m, and are present in an amount of 5–50% by weight based on the weight of the polyester. Microbeads of polystyrene should have a Tg of at least 20° C. higher than the Tg of the continuous matrix polymer and are hard compared to the continuous matrix polymer.

Elasticity and resiliency of the microbeads generally result in increased voiding, and it is preferred to have the Tg of the microbeads as high above that of the matrix polymer as possible to avoid deformation during orientation. It is not believed that there is a practical advantage to cross-linking above the point of resiliency and elasticity of the microbeads. The microbeads of cross-linked polymer are at least partially bordered by voids. The void space in the supports should occupy 2–60%, preferably 30–50%, by volume of the film support. Depending on the manner in which the supports are made, the voids may completely encircle the microbeads, e.g., a void may be in the shape of a doughnut (or flattened doughnut) encircling a micro-bead, or the voids may only partially border the microbeads, e.g., a pair of voids may border a microbead on opposite sides.

During stretching the voids assume characteristic shapes from the balanced biaxial orientation of films to the uniaxial orientation of microvoided films. Balanced microvoids are largely circular in the plane of orientation. The size of the microvoids and the ultimate physical properties depend upon the degree and balance of the orientation, temperature and rate of stretching, crystallization kinetics, the size distribution of the microbeads, and the like. The film supports according to this invention are prepared by: (a) forming a mixture of molten continuous matrixpolymer and cross-linked polymer wherein the cross-linked polymer is a multiplicity of microbeads uniformly dispersed throughout the matrix polymer, the matrix polymer being as described hereinbefore, the cross-linked polymer microbeads being as described hereinbefore, (b) forming a film support from the mixture by extrusion or casting, (c) orienting the article by stretching to form microbeads of cross-linked polymer uniformly distributed throughout the article and voids at least partially bordering the microbeads on sides thereof in the direction, or directions of orientation.

Methods of bilaterally orienting sheet or film material are well known in the art. Basically, such methods comprise stretching the sheet or film at least in the machine or longitudinal direction after it is cast or extruded an amount of about 1.5–10 times its original dimension. Such sheet or film may also be stretched in the transverse or cross-machine direction by apparatus and methods well known in the art, in amounts of generally 1.5–10 (usually 3–4 for polyesters and 6–10 for polypropylene) times the original dimension. Such apparatus and methods are well known in the art and are described in such U.S. Pat. No. 3,903,234.

The voids, or void spaces, referred to herein surrounding the microbeads are formed as the continuous matrix polymer is stretched at a temperature above the Tg of the matrix polymer. The microbeads of cross-linked polymer are relatively hard compared to the continuous matrix polymer. Also, due to the incompatibility and immiscibility between the microbead and the matrix polymer, the continuous matrix polymer slides over the microbeads as it is stretched, causing voids to be formed at the sides in the direction or directions of stretch, which voids elongate as the matrix polymer continues to be stretched. Thus, the final size and shape of the voids depends on the direction(s) and amount of stretching. If stretching is only in one direction, microvoids will form at the sides of the microbeads in the direction of stretching. If stretching is in two directions (bidirectional stretching), in effect such stretching has vector components extending radially from any given position to result in a doughnut-shaped void surrounding each microbead.

The preferred perform stretching operation simultaneously opens the microvoids and orients the matrix material. The final product properties depend on and can be controlled by stretching time-temperature relationships and on the type and degree of stretch. For maximum opacity and texture, the stretching is done just above the glass transition temperature of the matrix polymer. When stretching is done in the neighborhood of the higher glass transition temperature, both phases may stretch together and opacity decreases. In the former case, the materials are pulled apart, a mechanical anticompatibilization process. In general, void formation occurs independent of, and does not require, crystalline orientation of the matrix polymer. Opaque, microvoided films have been made in accordance with the methods of this invention using completely amorphous, noncrystallizing copolyesters as the matrix phase. Crystallizable/orientable (strain hardening) matrix materials are preferred for some properties like tensile strength and gas transmission barrier. On the other hand, amorphous matrix materials have special utility in other areas like tear resistance and heat sealability. The specific matrix composition can be tailored to meet many product needs. The complete range from crystalline to amorphous matrix polymer is part of the invention.

The invention may be used in conjunction with any liquid crystal display devices, typical arrangements of which are described in the following. Liquid crystals (LC) are widely used for electronic displays. In these display systems, an LC layer is situated between a polarizer layer and an analyzer layer and has a director exhibiting an azimuthal twist through the layer with respect to the normal axis. The analyzer is oriented such that its absorbing axis is perpendicular to that of the polarizer. Incident light polarized by the polarizer passes through a liquid crystal cell is affected by the molecular orientation in the liquid crystal, which can be altered by the application of a voltage across the cell. By employing this principle, the transmission of light from an external source, including ambient light, can be controlled. The energy required to achieve this control is generally much less than that required for the luminescent materials used in other display types such as cathode ray tubes. Accordingly, LC technology is used for a number of applications, including but not limited to digital watches, calculators, portable computers, electronic games for which light weight, low power consumption and long operating life are important features.

Active-matrix liquid crystal displays (LCDs) use thin film transistors (TFTs) as a switching device for driving each liquid crystal pixel. These LCDs can display higher-definition images without cross talk because the individual liquid crystal pixels can be selectively driven. Optical mode interference (OMI) displays are liquid crystal displays, which are "normally white," that is, light is transmitted through the display layers in the off state. Operational mode of LCD using the twisted nematic liquid crystal is roughly divided into a birefringence mode and an optical rotatory mode. "Film-compensated super-twisted nematic" (FSTN) LCDs are normally black, that is, light transmission is inhibited in the off state when no voltage is applied. OMI displays reportedly have faster response times and a broader operational temperature range.

Ordinary light from an incandescent bulb or from the sun is randomly polarized, that is, it includes waves that are oriented in all possible directions. A polarizer is a dichroic material that functions to convert a randomly polarized ("unpolarized") beam of light into a polarized one by selective removal of one of the two perpendicular plane-polarized components from the incident light beam. Linear polarizers are a key component of liquid-crystal display (LCD) devices.

There are several types of high dichroic ratio polarizers possessing sufficient optical performance for use in LCD devices. These polarizers are made of thin sheets of materials which transmit one polarization component and absorb the other mutually orthogonal component (this effect is known as dichroism). The most commonly used plastic sheet polarizers are composed of a thin, uniaxially-stretched polyvinyl alcohol (PVA) film which aligns the PVA polymer chains in a more-or-less parallel fashion. The aligned PVA is then doped with iodine molecules or a combination of colored dichroic dyes (see, for example, EP 0 182 632 A2, Sumitomo Chemical Company, Limited) which adsorb to and become uniaxially oriented by the PVA to produce a highly anisotropic matrix with a neutral gray coloration. To mechanically support the fragile PVA film it is then laminated on both sides with stiff layers of triacetyl cellulose (TAC), or similar support.

Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased. In color displays, the leakage problem not only degrades the contrast but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

The micro-voided homogenizing polymer film of the present invention can even out the luminance when the film is used as a light-scattering film in a backlight system. Back-lit LCD display screens, such as are utilized in portable computers, may have a relatively localized light source (ex. fluorescent light) or an array of relatively localized light sources disposed relatively close to the LCD screen, so that individual "hot spots" corresponding to the light sources may be detectable. The micro-voided polymer film serves to even out the illumination across the display. The liquid crystal display device includes display devices having a combination of a driving method selected from e.g. active matrix driving and simple matrix drive and a liquid crystal mode selected from e.g. twist nematic, supertwist nematic, ferroelectric liquid crystal and antiferroelectric liquid crystal mode, however, the invention is not restricted by the above combinations. In a liquid crystal display device, the oriented film of the present invention is necessary to be positioned in front of the backlight. The micro-voided polymer film of the present invention can even the lightness of a liquid crystal display device across the display because the film has excellent light-scattering properties to expand the light to give excellent visibility in all directions. Although the above effect can be achieved even by the single use of such oriented film, plural number of films may be used in combination. The homogenizing micro-voided polymer film may be placed in front of the LCD material in a transmission mode to disburse the light and make it much more homogenous. The present invention has a significant use as a light source destructuring device. In many applications, it is desirable to eliminate from the output of the light source itself the structure of the filament which can be problematic in certain applications because light distributed across the sample will vary and this is undesirable. Also, variances in the orientation of a light source filament or arc after a light source is replaced can generate erroneous and misleading readings. A homogenizing micro-voided film of the present invention placed between the light source and the detector can eliminate from the output of the light source any trace of the filament structure and therefore causes a homogenized output which is identical from light source to light source.

The micro-voided polymer films may be used to control lighting for stages by providing pleasing homogenized light that is directed where desired. In stage and television productions, a wide variety of stage lights must be used to achieve all the different effects necessary for proper lighting. This requires that many different lamps be used which is inconvenient and expensive. The films of the present invention placed over a lamp can give almost unlimited flexibility dispersing light where it is needed. As a consequence, almost any object, moving or not, and of any shape, can be correctly illuminated.

The reflection film formed by applying a reflection layer composed of a metallic film, etc., to the oriented film of the present invention can be used e.g. as a retroreflective member for a traffic sign. It can be used in a state applied to a car, a bicycle, person, etc.

The micro-voided films of the present invention may also be used in the area of law enforcement and security systems to homogenize the output from laser diodes (LDs) or light emitting diodes (LEDs) over the entire secured area to provide higher contrasts to infrared (IR) detectors. The films of the present invention may also be used to remove structure from devices using LED or LD sources such as in bank note readers or skin treatment devices. This leads to greater accuracy.

Fiber-optic light assemblies mounted on a surgeon's headpiece can cast distracting intensity variations on the surgical field if one of the fiber-optic elements breaks during surgery. A micro-voided film of the present invention placed at the ends of the fiber bundle homogenizes light coming from the remaining fibers and eliminates any trace of the broken fiber from the light cast on the patient. A standard ground glass diffuser would not be as effective in this use due to significant back-scatter causing loss of throughput.

The micro-voided polymer films of the present invention can also be used to homogeneously illuminate a sample under a microscope by destructuring the filament or arc of the source, yielding a homogeneously illuminated field of view. The films may also be used to homogenize the various modes that propagate through a fiber, for example, the light output from a helical-mode fiber.

The voided polymer films of the present invention also have significant architectural uses such as providing appropriate light for work and living spaces. In typical commercial applications, inexpensive micro-voided plastic sheets are used to help diffuse light over the room. A homogenizer of the present invention which replaces one of these conventional diffusers provides a more uniform light output so that light is diffused to all angles across the room evenly and with no hot spots.

The voided polymer films of the present invention may also be used to diffuse light illuminating artwork. The voided polymer film provides a suitable appropriately sized and directed aperture for depicting the artwork in a most desirable fashion.

Further, the oriented film of the present invention can be used widely as a part for optical equipment such as a displaying device. For example, it can be used as a light-reflection plate laminated with a reflection film such as a metal film in a reflective liquid crystal display device or a front scattering film directing the film to the front-side (observer's side) in the case of placing the metallic film to the back side of the device (opposite to the observer), in addition to the aforementioned light-scattering plate of a backlight system of a liquid crystal display device. The micro-voided oriented film of the present invention can be used as an electrode by laminating a transparent conductive layer composed of indium oxide represented by ITO film. If the material is to be used to form a reflective screen, e.g. front projection screen, a light-reflective layer is applied to the voided polymer surface.

In another embodiment of the invention, the thermoplastic diffusion layer of the invention is preferably formed from a polymer foam process. The polymer foam process allows for the formation of air voids in a polymer matrix providing a index of refraction difference between the air voids and the polymer matrix of greater than 0.2. Since the polymer air forming process creates air voids without the use of a voiding agent, no light energy scattering has been observed. The foaming of these polymers may be carried out through several mechanical, chemical, or physical means. Mechanical methods include whipping a gas into a polymer melt, solution, or suspension, which then hardens either by catalytic action or heat or both, thus entrapping the gas bubbles in the matrix. Chemical methods include such techniques as the thermal decomposition of chemical blowing agents generating gases such as nitrogen or carbon dioxide by the application of heat or through exothermic heat of reaction during polymerization. Physical methods include such techniques as the expansion of a gas dissolved in a polymer mass upon reduction of system pressure; the volatilization of low-boiling liquids such as fluorocarbons or methylene chloride, or the incorporation of hollow microspheres in a polymer matrix. The choice of foaming technique is dictated by desired foam density reduction, desired properties, and manufacturing process.

In a preferred embodiment of this invention polyolefins such as polyethylene and polypropylene, their blends and their copolymers are used as the matrix polymer in the foam core along with a chemical blowing agent such as sodium bicarbonate and its mixture with citric acid, organic acid salts, azodicarbonamide, azobisformamide, azobisisobutyrolnitrile, diazoaminobenzene, 4,4'-oxybis(benzene sulfonyl hydrazide) (OBSH), N,N'-dinitrosopentamethyltetramine (DNPA), sodium borohydride, and other blowing agent agents well known in the art. The preferred chemical blowing agents would be sodium bicarbonate/citric acid mixtures, azodicarbonamide, though others can also be used. If necessary, these foaming agents may be used together with an auxiliary foaming agent, nucleating agent, and a cross-linking agent.

Diffusion film samples were measured with the Hitachi U4001 UV/Vis/NIR spectrophotometer equipped with an integrating sphere. The total transmittance spectra were measured by placing the samples at the beam port with the voided side towards the integrating sphere. A calibrated 99% diffusely reflecting standard (NIST-traceable) was placed at the normal sample port. The diffuse transmittance spectra were measured in like manner, but with the 99% tile removed. The diffuse reflectance spectra were measured by placing the samples at the sample port with the coated side towards the integrating sphere. In order to exclude reflection from a sample backing, nothing was placed behind the sample. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2 degree angle from the incident light angle. The diffuse light transfer efficiency is the percent of light that is passed through the sample by diffuse transmittance. Diffuse reflectance is defined as the percent of light reflected by the sample. The percentages quoted in the examples were measured at 500 nm. These values may not add up to 100% due to absorbencies of the sample or slight variations in the sample measured.

Embodiments of the invention may provide not only improved light diffusion and transmission but also a diffusion film of reduced thickness, that eliminates the need for an air gap, and that has reduced light scattering tendencies.

The invention has been described in detail with particular reference to certain preferred embodiments thereof, but it will be understood that variations and modifications can be effected within the spirit and scope of the invention.

EXAMPLES

In this series of examples, commercially available polyester polymer was melt extruded with organic voiding beads. This the examples below stretch extent, void size and thickness were varied to produce a series of LC (liquid crystal) diffuser sheets including the 'stacked' microvoided sheet of the invention. The examples below will show that microvoided polyester polymer diffuser sheets provide excellent light diffusion and high light transmission, both of which are required for the demanding LC component market and that 'stacked' microvoided sheets are advantaged to a monolayer diffuser film.

Example 1

A transparent amorphous film composed of three layers having an overall width of 16 cm was manufactured by a co-extrusion process. One of the outer layers, hereafter referred to as layer (A), was composed of poly(ethylene terephthalate) ("PET", commercially available from Eastman Chemical Company as Eastapak #7352). The intrinsic viscosity (I.V.) of the PET 7352 resin was 0.74. This layer was approximately 245 µm in thickness. The center layer, hereafter referred to as layer (B), was composed of PET (commercially available from Eastman Chemical Company as Eastapak #9921) impregnated with a particulate voiding agent. The intrinsic viscosity (I.V.) of the PET 9921 resin was 0.80. This layer was approximately 30 µm in thickness. The remaining outer layer, hereafter referred to as layer (C), was composed of PET 9921 and impregnated with a particulate voiding agent of a different size than the voiding agent in layer (B). This layer was approximately 48 µm in thickness. All voided layers in each example were impregnated with approximately the same concentration of void initiating beads and thus have approximately the same frequency of voids.

The particulate voiding agents were created as follows. A 27 mm twin screw compounding extruder heated to 275° C. was used to mix polystyrene beads cross-linked with divinylbenzene with PET 9921. The beads used for layer (B) had an average particle diameter of 2 µm. The beads used for layer (C) had an average particle diameter of 5 µm. The beads were added to attain a 20% by weight loading in the PET 9921 matrix. The components were metered into the compounder and one pass was sufficient for dispersion of the beads into the polyester matrix. The different size beads were compounded in two separate batches. The compounded material was extruded through a strand die, cooled in a water bath, and pelletized.

Prior to the film co-extrusion process, the PET 7352 resin and the compounded pellets were dried separately in desiccated driers at 150° C. for 12 hours. The cast sheet was co-extruded in an A/B/C layer structure. A standard 3.18 cm diameter screw extruder was used to extrude the PET 7352 resin for layer (A). A standard 1.91 cm diameter screw extruder was used to extrude the compounded pellets for layer (B). A standard 3.18 cm diameter screw extruder was used to extrude the compounded pellets for layer (C). The 275° C. melt streams were fed into a 7 inch multi-manifold die also heated at 275° C. As the extruded sheet emerged from the die, it was cast onto a quenching roll set at 60–70° C.

The amorphous cast sheet was cut into 13 cm×13 cm squares. The sheet was then stretched simultaneously in the X and Y-directions using a standard laboratory film stretching unit. The cast sheet was stretched symmetrically in the X and Y-directions to an extent of approximately 2 times the original sheet dimensions. The sheet temperature during stretching was 103° C. The processing conditions are shown in Table 1.

Example 2

A transparent amorphous film composed of three layers having an overall width of 16 cm was manufactured by a co-extrusion process as described in Example 1. Layer (A), composed of PET 7352, was approximately 245 µm in thickness. Layer (B), composed of PET 9921 impregnated with cross-linked polystyrene as a particulate voiding agent having an average particle size of 2 µm, was approximately 30 µm in thickness. Layer (C), composed of PET 9921 impregnated with cross-linked polystyrene as a particulate voiding agent having an average particle size of 5 µm, was approximately 48 µm in thickness. The polymers composing the layers were processed as described in Example 1.

The amorphous cast sheet was stretched symmetrically in a similar fashion as described in Example 1. The sheet was stretched symmetrically in the X and Y-directions to an extent of approximately 2.5 times the original sheet dimensions. The sheet temperature during stretching was 103° C. The processing conditions are shown in Table 1.

Example 3

A transparent amorphous film composed of three layers having an overall width of 16 cm was manufactured by a co-extrusion process as described in Example 1. Layer (A), composed of PET 7352, was approximately 245 µm in thickness. Layer (B), composed of PET 9921 impregnated with cross-linked polystyrene as a particulate voiding agent having an average particle size of 2 μm, was approximately 30 μm in thickness. Layer (C), composed of PET 9921 impregnated with cross-linked polystyrene as a particulate voiding agent having an average particle size of 5 μm, was approximately 48 μm in thickness. The polymers composing the layers were processed as described in Example 1.

The amorphous cast sheet was stretched symmetrically in a similar fashion as described in Example 1. The sheet was stretched symmetrically in the X and Y-directions to an extent of approximately 3 times the original sheet dimensions. The sheet temperature during stretching was 103° C. The processing conditions are shown in Table 1.

Example 4

A transparent amorphous film composed of three layers having an overall width of 16 cm was manufactured by a co-extrusion process as described in Example 1. Layer (A), composed of PET 7352, was approximately 245 μm in thickness. Layer (B), composed of PET 9921 impregnated with cross-linked polystyrene as a particulate voiding agent having an average particle size of 2 μm, was approximately 30 μm in thickness. Layer (C), composed of PET 9921 impregnated with cross-linked polystyrene as a particulate voiding agent having an average particle size of 5 μm, was approximately 48 μm in thickness. The polymers composing the layers were processed as described in Example 1.

The amorphous cast sheet was stretched symmetrically in a similar fashion as described in Example 1. The sheet was stretched symmetrically in the X and Y-directions to an extent of approximately 3.5 times the original sheet dimensions. The sheet temperature during stretching was 103° C. The processing conditions are shown in Table 1.

Example 5

A transparent amorphous film composed of three layers having an overall width of 16 cm was manufactured by a co-extrusion process as described in Example 1. Layer (A), composed of PET 7352, was approximately 245 μm in thickness. Layer (B), composed of PET 9921 impregnated with cross-linked polystyrene as a particulate voiding agent having an average particle size of 2 μm, was approximately 30 μm in thickness. Layer (C), composed of PET 9921 impregnated with cross-linked polystyrene as a particulate voiding agent having an average particle size of 5 μm, was approximately 48 μm in thickness. The polymers composing the layers were processed as described in Example 1.

The amorphous cast sheet was stretched symmetrically in a similar fashion as described in Example 1. The sheet was stretched symmetrically in the X and Y-directions to an extent of approximately 4 times the original sheet dimensions. The sheet temperature during stretching was 103° C. The processing conditions are shown in Table 1.

Example 6

A transparent amorphous film composed of two layers having an overall width of 16 cm was manufactured by a co-extrusion process as described in Example 1. However, layer (C) was omitted from the co-extrusion process. Layer (A), composed of PET 7352, was approximately 245 μm in thickness. Layer (B), composed of PET 9921 impregnated with cross-linked polystyrene as a particulate voiding agent having an average particle size of 2 Am, was approximately 30 μm in thickness. The polymers composing the layers were processed as described in Example 1.

The amorphous cast sheet was stretched symmetrically in a similar fashion as described in Example 1. The sheet was stretched symmetrically in the X and Y-directions to an extent of approximately 3 times the original sheet dimensions. The sheet temperature during stretching was 103° C. The processing conditions are shown in Table 1.

Example 7

A transparent amorphous film composed of two layers having an overall width of 16 cm was manufactured by a co-extrusion process as described in Example 1. However, layer (C) was omitted from the co-extrusion process. Layer (A), composed of PET 7352, was approximately 245 μm in thickness. Layer (B), composed of PET 9921 impregnated with cross-linked polystyrene as a particulate voiding agent having an average particle size of 2 μm, was approximately 30 μm in thickness. The polymers composing the layers were processed as described in Example 1.

The amorphous cast sheet was stretched symmetrically in a similar fashion as described in Example 1. The sheet was stretched symmetrically in the X and Y-directions to an extent of approximately 3.5 times the original sheet dimensions. The sheet temperature during stretching was 103° C. The processing conditions are shown in Table 1.

Example 8

A transparent amorphous film composed of two layers having an overall width of 16 cm was manufactured by a co-extrusion process as described in Example 1. However, layer (C) was omitted from the co-extrusion process. Layer (A), composed of PET 7352, was approximately 245 μm in thickness. Layer (B), composed of PET 9921 impregnated with cross-linked polystyrene as a particulate voiding agent having an average particle size of 2 μm, was approximately 30 μm in thickness. The polymers composing the layers were processed as described in Example 1.

The amorphous cast sheet was stretched symmetrically in a similar fashion as described in Example 1. The sheet was stretched symmetrically in the X and Y-directions to an extent of approximately 4 times the original sheet dimensions. The sheet temperature during stretching was 103° C. The processing conditions are shown in Table 1.

TABLE 1

| | Example Number | | | | | | | |
| --- | --- | --- | --- | --- | --- | --- | --- | --- |
| | 1 | 2 | 3 | 4 | 5 | 6 | 7 | 8 |
| | Inv | Inv | Inv | Inv | Inv | Comp | Comp | Comp |
| Cast Layer (A) Thickness (micron) | 245 | 245 | 245 | 245 | 245 | 245 | 245 | 245 |

TABLE 1-continued

| | Example Number | | | | | | | |
|---|---|---|---|---|---|---|---|---|
| | 1 | 2 | 3 | 4 | 5 | 6 | 7 | 8 |
| Cast Layer (B) Thickness (micron) | 30 | 30 | 30 | 30 | 30 | 30 | 30 | |
| Cast Layer (C) Thickness (micron) | 48 | 48 | 48 | 48 | 48 | 48 | 48 | 48 |
| Average Bead Size in Layer B (micron) | 2 | 2 | 2 | 2 | 2 | 2 | 2 | 2 |
| Average Bead Size in Layer C (micron) | 5 | 5 | 5 | 5 | 5 | n/a | n/a | n/a |
| Approximate Symmetric Stretching Extent | 2× | 2.5× | 3× | 3.5× | 4× | 3× | 3.5× | 4× |
| Stretching Temperature (degree C.) | 103 | 103 | 103 | 103 | 103 | 103 | 103 | 103 |
| Stretched Layer (A) Thickness (micron) | 61 | 39 | 27 | 20 | 15 | 27 | 20 | 15 |
| Stretched Layer (B) Thickness (micron) | 8 | 5 | 3 | 2 | 2 | 3 | 2 | 2 |
| Stretched Layer (C) Thickness (micron) | 12 | 8 | 5 | 4 | 3 | n/a | n/a | n/a |
| Percent Total Transmission at 500 nm | 78 | 71.5 | 69 | 72.4 | 75 | 83 | 84.7 | 85 |
| Percent Diffuse Transmission at 500 nm | 76 | 70.3 | 68 | 70.8 | 73 | 54 | 63.2 | 67 |
| Percent Spectral Transmission at 500 nm | 1.6 | 1.1 | 1 | 1.7 | 2.6 | 29 | 21.5 | 18 |
| Percent Diffuse Reflection at 500 nm | 26 | 31.4 | 33 | 30.9 | 28 | 17 | 16.8 | 17 |

As the data above clearly indicates, microvoided polymer diffusers containing multiple layers provided much higher diffuse transmission efficiencies. Comparing examples #3 and #6 it can be seen that with approximately the same thickness and frequency of bead, #3 with layers with varying bead size and thus varying void size, had a much higher diffuse transmission efficiency, 68% versus 54%. Examples #4 compared to #8 and examples #5 compared to #9 illustrate this increased efficiency as well. The total transmission is higher at 500 nm for the single layer diffusers, but the spectral component of the light is very high as well. For a backlit application, this means that these diffusion films do not fully diffuse the light, the backlight can be seen, and the light is not evened out across the display. For the same thickness, if 2 or more layers are manufactured instead of a single layer, the diffuse transmission efficiency will be greater thus lead to more efficient diffusing for the backlight of an LCD display.

From the data above, the general trend of the data is for diffuse transmission efficiency to be roughly inversely proportional to voided layer thickness, thus demonstrating that a thin, microvoided diffuser with mcirovoided layers provides excellent light diffusion and yet has a high transmission rate, allowing LC devices to be brighter. A brighter LC device has significant commercial value in that a brighter image allows for a reduction in battery power and better allows the LC device to be used in demanding outdoor sunlight conditions.

Further, because the example materials were constructed from oriented polyester, the materials have a higher elastic modulus compared to cast diffuser sheets. Because the example materials were oriented, the impact resistance was also improved compared to cast diffuser sheets making the example materials more scratch resistant. Finally, the oriented polymer diffuser layers of the example allow for the voided layer to be thin and therefore cost efficient as the materials content of the example materials is reduced compared to prior art materials.

While this example was primarily directed toward the use of thermoplastic materials for LC devices, the materials of the invention have value in other diffusion applications such as back light display, imaging elements containing a diffusion layer, a diffuser for specular home lighting and privacy screens.

The entire contents of the patents and other publications referred to in this specification are incorporated herein by reference.

PARTS LIST

2. Light guide/acrylic board
4. Reflection tape
6. Reflection tape
8. Reflection film
10. Reflection tape
12. Light diffuser/diffusion film
14. Brightness enhancement film
16. Polarization film
18. Visible light source
22. Polymer matrix containing small voids
24. Small air voids
26. Interface between voided layers of different size
28. Polymer matrix containing large voids
30. Large air voids

What is claimed is:

1. A light diffuser comprising a polymeric film wherein the film comprises a plurality of layers having microvoids in which the average length of the microvoid in the x, y, or z direction or the frequency varies by at least 28% between at least two layers, and the variation is sufficient to increase the diffuse light transmission efficiency by at least 10% at 500 nm compared to a single voided layer of the same thickness as the layers but with only one frequency or void size, wherein the diffuse light transmission efficiency of the diffuser is greater than 80% at 500 nm.

2. The light diffuser of claim 1 wherein the polymeric film comprises exactly two voided layers.

3. The light diffuser of claim 1 wherein the polymeric film contains at least two voided layers and at least one non-voided layer.

4. The light diffuser of claim 3 wherein the voided and non-voided layers are integral.

5. The light diffuser of claim 3 wherein the polymeric film the non-voided layer further comprises addenda.

6. The light diffuser of claim 1 wherein the polymeric film contains at least two voided layers that are separated by a non-voided layer.

7. The light diffuser of claim 1 wherein the said plurality of voided layers that vary in geometry or frequency improve the diffuse light transmission efficiency compared to a single voided layer of the same thickness and either void geometry or frequency by at least 10% at 500 nm.

8. The light diffuser of claim 1 wherein the microvoids have a substantially circular cross-section in a plane perpendicular to the direction of light travel.

9. The light diffuser of claim 1 wherein the x/y/z size or frequency of the voids vary by between 28% and 300% between at least two layers.

10. The light diffuser of claim 1 wherein the x/y/z size or frequency of the voids vary by at least 60% between at least two layers.

11. The light diffuser of claim 1 wherein the voided layers are arranged in order of increasing size of voids in reference to the light passing through the film.

12. The light diffuser of claim 1 wherein the voided layers are arranged in order of decreasing size of voids in reference to the light passing through the film.

13. The light diffuser of claim 1 wherein the voided layers are arranged in order of increasing frequency of voids in reference to the light passing through the film.

14. The light diffuser of claim 1 wherein the voided layers are arranged in order of decreasing frequency of voids in reference to the light passing through the film.

15. The light diffuser of claim 1 wherein the film contains at least one polymeric skin layer.

16. The light diffuser of claim 1 wherein the difference in refractive index between the thermoplastic polymeric material and the microvoids is greater than 0.2.

17. The light diffuser of claim 1 wherein said microvoids are formed by organic microspheres.

18. The light diffuser of claim 1 wherein the microvoids contain cross-linked polymer beads.

19. The light diffuser of claim 1 wherein the microvoids contain a gas.

20. The light diffuser of claim 1 wherein the elastic modulus of the light diffuser is greater than 500 MPa.

21. The light diffuser of claim 1 wherein said diffuse light transmission efficiency is greater than 87% at 500 nm.

22. The light diffuser of claim 1 wherein said microvoids have a major axis diameter to minor axis diameter ratio of less than 2.0.

23. The light diffuser of claim 1 wherein said microvoids have a major axis diameter to minor axis diameter ratio of between 1.0 and 1.6.

24. The light diffuser of claim 1 wherein said thermoplastic layers contain greater than 4 index of refraction changes greater than 0.20 parallel to the direction of light travel.

25. The light diffuser of claim 1 wherein said microvoids have an average volume of between 8 and 42 cubic micrometers.

26. The light diffuser of claim 1 wherein the said light diffuser has a thickness less than 250 micrometers.

27. The light diffuser of claim 1 wherein said thermoplastic layer comprises polyolefin polymer.

28. The light diffuser of claim 1 wherein said thermoplastic layer comprises polyester polymer.

29. The light diffuser of claim 18 wherein said cross linked polymer beads have a mean particle size less than 2.0 micrometers.

30. The light diffuser of claim 18 wherein said cross linked polymer beads have a mean particle size between 0.30 and 1.7 micrometers.

31. The light diffuser of claim 1 wherein the total light transmission is at least 65% at 500 nm.

* * * * *